THOMAS R. SMITH
INVENTOR.

THOMAS R. SMITH
INVENTOR.

United States Patent Office 3,160,023
Patented Dec. 8, 1964

3,160,023
VARIABLE SPEED DRIVE
Thomas R. Smith, Newton, Iowa, assignor to The Maytag Company, Newton, Iowa, a corporation of Delaware
Filed Aug. 24, 1962, Ser. No. 219,328
4 Claims. (Cl. 74—192)

This invention relates to a variable speed transmission, and more particularly to a continuously variable transmission for changing the rotational speed over a graduated range.

It is an object of the invention to provide a variable speed transmission, which can be used for many devices, including a combination washer-drier unit. It is a further object of the invention to provide a variable speed drive, which may be gradually varied over a speed range. It is another object of the invention to provide a variable speed transmission of high efficiency. It is still another object of the invention to provide a variable speed transmission, which is smooth, silent, and vibration free in operation. Further objects and advantages of this invention will become evident as the description proceeds and from an examination of the accompanying drawings which illustrate one embodiment of the invention and in which similar numerals refer to similar parts throughout the several views.

Figure 2:
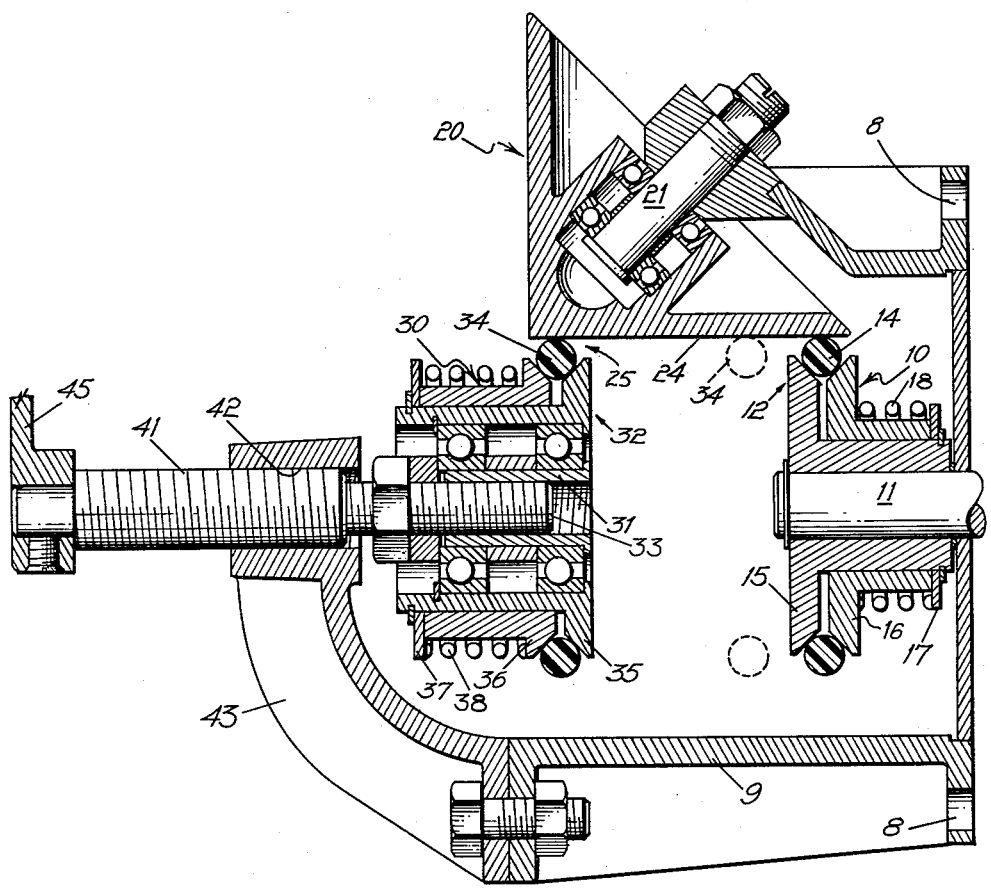
FIGURE 2 is a sectional view taken substantially along line 2—2 of FIGURE 1.

Referring to FIGURE 2 of the drawings, there is shown a supporting frame 9, which may be suitably secured to an electric motor frame (not shown) by bolt holes 8. A driving element 10 in the form of pulley 12 is secured to drive shaft 11 and relative rotation prevented by a key member (not shown). A flexible resilient annulus 14 is mounted on pulley 12.

Figure 1:
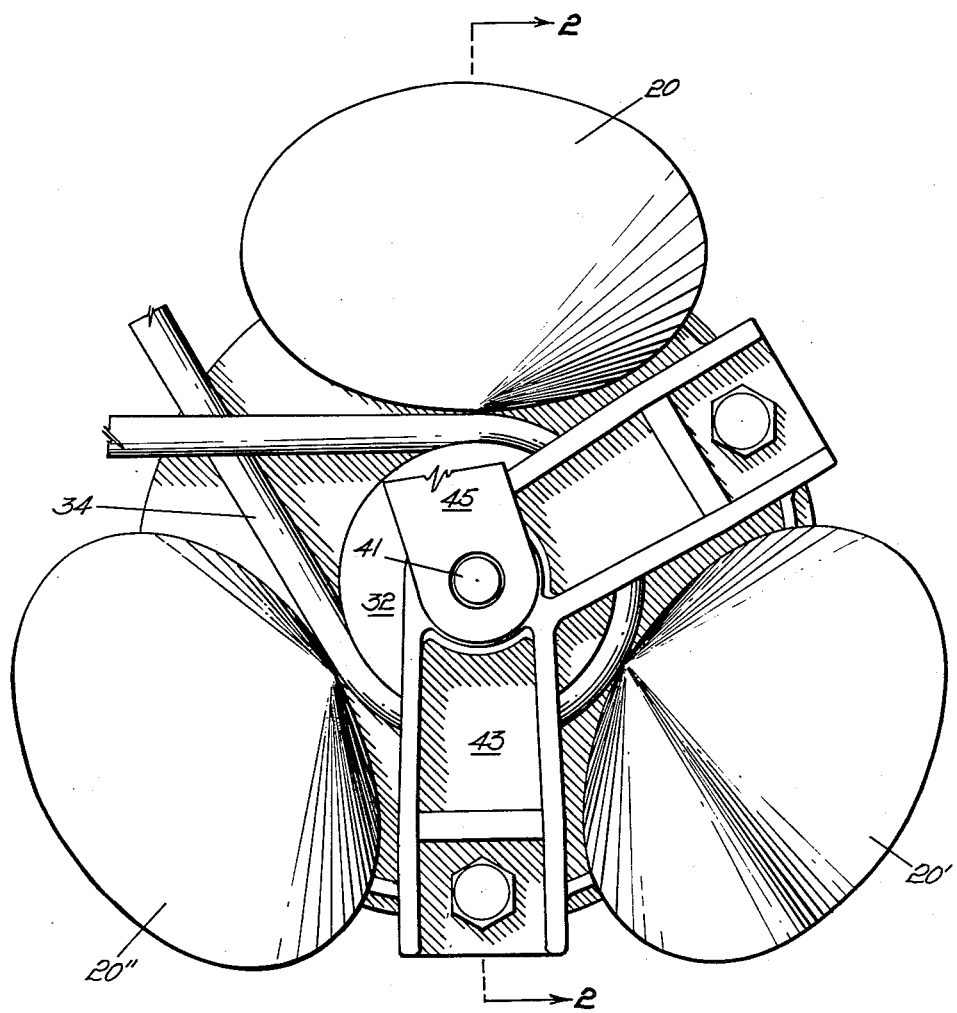
FIGURE 1 is an end view of a variable speed transmission embodying the invention.

As shown in FIGURE 1, a plurality of right circular cones 20, 20', and 20" are rotatably mounted on frame 9 so that the innermost conical surface areas circumscribe a cylindrical space. Referring to FIGURE 2, cone 20 which is illustrated and hereinafter described is typical of cones 20' and 20". Cone 20 is journalled on shaft 21, which is supported by frame 9. The slant height line 24 of the cone 20 is in contact with the annulus 14, and is parallel to the axis of the pulley 12. The slant height line 24 of cone 20 together with corresponding lines of cones 20' and 20" defines a cylindrical space.

The diameter of the annulus 14 and its cross section are such that a small amount of force is provided by the annulus against the surfaces of the cones. This force may be maintained by movement of sheave half 16 relative to sheave half 15. Sheave half 16, slidable relative to sheave half 15, is biased towards sheave half 15 by spring 18 for automatically adjusting pulley 12 so that annulus 14 exerts pressure against the cones. Ring 17 serves as a limiting stop for sheave half 16 and as a retainer for spring 18.

A driven element 30 is in the form of a pulley 32 with an endless belt 34. The pulley 32 is journalled on sleeve 31 and is rotatably mounted in the cylindrical space formed by the cones 20, 20', 20". The round flexible resilient endless belt 34 is mounted on pulley 32 in frictional engagement with the surfaces of the cones. The diameter of pulley 32 and the cross section of the belt 34 are such that a small amount of squeeze may be maintained on the belt. Sheave half 36 is relatively movable to sheave half 35 and is biased toward sheave half 35 by spring 38 for adjusting pulley 32 so as to place pressure against the belt 34. Spring 38 is retained by stop ring 37.

Referring to FIGURE 2, the slant height line 24 of cone 20 is in contact with endless belt 34 and is parallel to the axis of pulley 32. Cone 20 typifies the remaining cones 20' and 20", and all of the cones thereby define a cylindrical space for receiving driven element 30.

The driven element 30 is longitudinally movable along the axis of the cylindrical space created by the cones. Sleeve 31 is threadably connected to shaft 33 which is an extension of threaded post 41. Threaded post 41 is screw-threaded in threaded aperture 42 of bracket 43. An arm 45 may be used to rotate threaded post 41 in the threaded aperture 42 so as to adjust the position of the driven element along the slant height lines on surfaces of the cones. As shown in dotted lines of FIGURE 2, the endless belt 34 may be positioned at a range of longitudinal locations along the slant height lines on the conical surfaces of the cones by operation of threaded post 41 in threaded aperture 42.

From the foregoing, operation of the variable speed transmission of the invention is believed apparent. The driving element 10 rotates the cones 20, 20', and 20" in the same direction at the same rotational speeds. The driven element 30 may be positioned at various points to change the output speeds. Referring to FIGURE 2, the minimum output speed is shown by the full line positions. The maximum output speed is shown by the dotted line position of the endless belt 34.

The endless belt 34 may be connected to many different types of pulley driven devices. It will be apparent that instead of an endless belt the power take-off from the driven element 30 may be a variety of systems.

In the drawings and specification there has been set forth one embodiment of the invention, and although specific terms are employed, these are used in a generic and descriptive sense only, and not for purposes of limitation. Changes in form and proportion of parts, as well as the substitution of equivalents are contemplated, as circumstances may suggest or render expedient, without departing from the spirit or scope of this invention as further defined in the following claims.

What is claimed is:

1. A variable speed transmission comprising, a plurality of cone members defining cylindrical space between the inner conical surfaces thereof, means for driving said cone members in the same direction and at the same rotational speed, an endless belt connected to an external driven device and about a generally annular driven member rotatably mounted in the cylindrical space defined by said cone members, said endless belt positioned in frictional driven engagement with said cone members, and means for adjusting said driven member to place said endless belt at selected positions along its axis against the conical surfaces of said cone members.

2. The variable speed transmission set forth in claim 1 and said annular driven member further including biasing means to urge said belt outwardly against said cone members.

3. A variable speed transmission comprising, a support member, a plurality of circular cones rotatably mounted on said support member, said cones defining cylindrical space between the innermost conical surfaces thereof, means for driving said cones in the same direction and at the same rotational speed, a driven member including an endless belt connected to an external driven device and mounted in the cylindrical space defined by said cones, said cones frictionally engaging the periphery of said endless belt, and means for adjusting said driven member along said cones to selected positions along a longitudinal axis to change the rotational speed.

4. A continuously variable speed transmission comprising an endless belt connected to an external driven device and disposed about a generally annular driven member rotatable about an axis, means for longitudinally adjustably supporting said driven member at selected positions along said axis, a plurality of circular cones about said axis frictionally engaging the periphery of said endless belt about said annular driven member along the positions of axial adjustment, and means for driving said cones in the same direction and at the same rotational speed.

References Cited in the file of this patent

UNITED STATES PATENTS

| | | |
|---|---|---|
| 789,924 | Macon | May 16, 1905 |
| 818,047 | Power | Apr. 17, 1906 |
| 2,642,749 | Wood | June 23, 1953 |
| 2,941,409 | Witt | June 21, 1960 |
| 3,023,643 | Weber | Mar. 6, 1962 |